United States Patent Office 3,468,751
Patented Sept. 23, 1969

3,468,751
GLASS COATED WITH ORGANOSILICON
COMPOUNDS
Giuliana C. Tesoro, Dobbs Ferry, N.Y., assignor to J. P.
Stevens & Co., Inc., New York, N.Y., a corporation of
Delaware
No Drawing. Original application Jan. 16, 1963, Ser. No.
251,741. Divided and this application June 8, 1966,
Ser. No. 566,175
Int. Cl. B32b 17/06; C03c 17/30
U.S. Cl. 161—193                              46 Claims

ABSTRACT OF THE DISCLOSURE

Glass coated with an organosilicon polymeric compound having silicon, amine and mercaptan or disulfide groups, the silicon having one or more hydrolyzable radicals attached to it and being bonded to the sulfur-containing group through a hydrocarbon chain having one or more interposed amino groups. The coated glass is characterized by increased dye-receptivity and is also used to make laminates with sulfur-vulcanizable polymerizates.

---

The application of the present invention is a division of the application Ser. No. 251,741, filed by the inventor herein on Jan. 16, 1963, and issued as U.S. Patent No. 3,278,484.

The present invention relates to monomeric and polymeric organosilicon compounds containing sulfur, preferably in the form of mercaptan or disulfide. In the preferred class of compounds, the silicon atom is separated from the sulfur atom by at least one carbon atom. One aspect of the invention relates to such compounds in which a hydrolyzable group is attached to the silicon. The invention also relates to methods of preparation of organosilicon compounds of the type described above. The invention relates further to the use of such organosilicon compounds for the treatment of surfaces, such as glass, and for the bonding of surfaces such as glass, to a substance having affinity for sulfur in mercaptan or disulfide form.

In order to form a bond on a surface such as glass it is generally acknowledged that a compound containing a silicon atom is desirable. Preferably, a hydrolyzable radical, for example an alkoxy radical, should be attached to the silicon atom. This is recognized to provide, in general, a stronger bond.

The sulfur atom, in the form of mercaptan or disulfide, is known to possess an affinity for certain hydrocarbon linkages and a reactivity with certain functional groups. Compounds containing such sulfur atoms are used for vulcanizing and other reactions. Thus, a compound containing both a silicon atom and a sulfur atom, the latter in the form of mercaptan or disulfide, would be suitable for bonding certain polymeric structures to a sulfur such as glass. Such a compound would be generally suitable for bonding any substances or compounds which have an affinity for sulfur.

Although many organofunctional silanes are known in the art, considerable difficulty has been encountered in attempts to prepare compounds which contain a mercaptan group which is reactive. The difficulties encountered by the prior art workers in attempts to prepare organofunctional silanes containing a reactive sulfur group have been due to the fact that known reactions for introducing mercaptan radicals into organic compounds are generally carried out under conditions which induce hydrolysis and/or polymerization of alkoxy silanes. Thus, the desirable reactivity of the alkoxy silane substituents is lost during the reaction in which the sulfur is introduced into the molecule.

Accordingly, it is an object of the present invention to provide a novel group of organosilicon compounds containing sulfur in the form of mercaptans or disulfide.

A further object of the present invention is to provide organosilicon compounds containing sulfur in the form of mercaptan or disulfide in which a hydrolyzable radical is attached to the silicon atom.

It is a further object of this invention to provide methods of preparation of the above organosilicon compounds.

It is a further object of the present invention to provide processes in which the compounds of the present invention are used to treat glass and similar surfaces.

It is an additional object of the present invention to provide compounds suitable for use in bonding glass to vulcanizable substances, such as rubber.

In view of the complicated nature of the chemistry involved in the monomeric and polymeric compounds of the present invention, it is believed desirable to classify the various compounds contemplated by the present invention into categories, which, although artificial, will simplify the discussion of the invention. Many of the monomeric compounds contemplated by this present invention are polyfunctional, and accordingly these compounds can polymerize in many different ways to produce different polymers. In many instances, the polymers are prepared prior to use, and in other instances the polymers may be formed in situ.

The following section of this specification is devoted to a discussion of the compounds of the present invention which are in monomeric form, and is also devoted to the methods of preparation thereof.

MONOMERS

Compounds of the present invention in monomeric form may be produced by the following reaction:

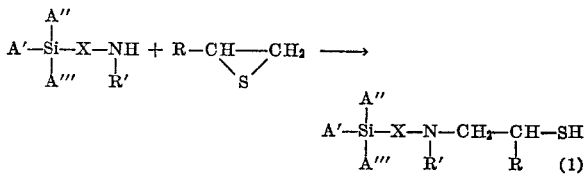

(1)

where A′, A″ and A‴ are selected from the group consisting of substituted and unsubstituted aliphatic, aryl, aralkyl and alkoxy radicals; X is selected from the group consisting of a divalent organic radical having terminal carbon atoms and —CH₂—; R is selected from the group consisting of hydrogen, substituted and unsubstituted aliphatic, aryl and aralkyl radicals; and R′ is selected from the group consisting of hydrogen, substituted and unsubstituted aliphatic radicals, and the following group:

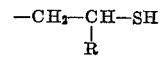

With respect to the radical in the above R′ group for which the structural formula is given, it can be seen that this radical will be present in the organofunctional silane molecule in those instances in which the molecule has already reacted with a sulfur-containing compound so that one of the two hydrogens attached to the nitrogen atom would have already been replaced. This will be discussed below.

A typical example of the reaction set forth in Equation 1 above is as follows:

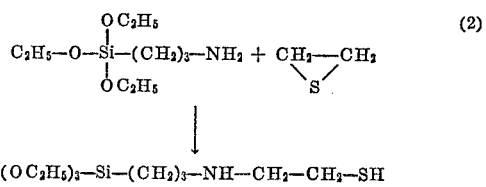

(2)

Instead of the ethylene sulfide, as shown in Equation 2 above, ethylene monothiol carbonate may be used:

$$A'-\underset{\underset{A'''}{|}}{\overset{\overset{A''}{|}}{Si}}-X-NH + \begin{matrix} CH_2-CH_2 \\ | \quad\quad | \\ O \quad\quad S \\ \diagdown C \diagup \\ \| \\ O \end{matrix} \longrightarrow$$
$$\quad\quad\quad\quad\quad\quad\quad R'$$

$$A'-\underset{\underset{A'''}{|}}{\overset{\overset{A''}{|}}{Si}}-X-\underset{\underset{R'}{|}}{N}-CH_2-CH_2-SH \quad (3)$$

In Equation 3 above, A', A'' and A''', X and R' are as discussed in connection with Equation 1 above.

Also suitable for use in forming monomeric compounds of the present invention is ethyl-2-mercapto ethyl carbonate:

$$A'-\underset{\underset{A'''}{|}}{\overset{\overset{A''}{|}}{Si}}-X-\underset{\underset{R'}{|}}{NH} + C_2H_5-O-\underset{\underset{O}{\|}}{C}O-CH_2-CH_2-SH \quad (4)$$

$$\downarrow$$

$$A'-\underset{\underset{A'''}{|}}{\overset{\overset{A''}{|}}{Si}}-X-\underset{\underset{R'}{|}}{N}-CH_2-CH_2-SH$$

The methods of preparation shown above in Equations 3 and 4 are preferred over that of Equation 1 due to the higher yields obtainable. Furthermore, the formation of impurities resulting from self-condensation of the ethylene sulfide derivative is minimized.

The reaction shown in Equation 4 is particularly suitable for the preparation of monomeric compounds containing a plurality of mercaptan groups per molecule. Thus, for example, the following reaction provides compounds having 1, 2 and 3 mercaptan groups per molecule:

$$(CH_3-O)_3-Si-(CH_2)_2-NH(CH_2)_2-NH_2 + C_2H_5-O-\underset{\underset{O}{\|}}{C}-O-CH_2-CH_2-SH$$

$$\downarrow$$

$$(CH_3-O)_3-Si-(CH_2)_2-NH_2(CH_2)_2-NH-CH_2-CH_2-SH \quad (5)$$

$$(CH_3-O)_3-Si-(CH_2)_2-NH-(CH_2)_2-NH-CH_2-CH_2-SH \quad (6)$$

$$+$$

$$C_2H_5-O-\underset{\underset{O}{\|}}{C}-O-CH_2-CH_2-SH$$

$$\downarrow$$

$$(CH_3-O)_3Si-(CH_2)_2-NH-(CH_2)_2-N\diagup^{CH_2-CH_2-SH}_{\diagdown CH_2-CH_2-SH}$$

$$(CH_3O)_3-Si-(CH_2)_2-NH-(CH_2)_2-N\diagup^{CH_2-CH_2-SH}_{\diagdown CH_2-CH_2-SH}$$

$$+$$

$$C_2H_5-O-\underset{\underset{O}{\|}}{C}-O-CH_2-CH_2-SH$$

$$\downarrow$$

$$(CH_3O)_3-Si-CH_2-CH_2-\underset{\underset{CH_2-CH_2-SH}{|}}{N}-(CH_2)_2-N\diagup^{CH_2-CH_2-SH}_{\diagdown CH_2-CH_2-SH} \quad (7)$$

Comparing (5) above with Equation 1, it can be seen that "X" of Equation 1 is represented by the following radical:

$$-CH_2-CH_2-\underset{\underset{H}{|}}{N}-CH_2-CH_2- \quad (8)$$

Comparing Equation 5 with Equation 1, it can be seen that "R'" in Equation 1 is represented by hydrogen.

With reference to Equation 6 it can be seen that the terminal nitrogen atom of the product is attached to two radicals having the following formula:

$$-CH_2-CH_2-SH \quad (9)$$

It will be recalled, that in defining "R'" in Equation 1, it was indicated that "R'" could be represented by the following radical:

$$-CH_2-\underset{\underset{R}{|}}{CH}-SH \quad (10)$$

Thus, it can be seen that the radical of Formula 9 is defined by radical of Formula 10 if "R" of Formula 10 is hydrogen. Going back to Equation 1, it will be noted that hydrogen is one of the groups from which "R" can be selected.

With reference to Equation 7 it can be seen that the end product has three mercaptan radicals attached to the nitrogen atoms of the molecule. Thus, if the product of Equation 7 be compared with Equation 1, it will be seen that "X" of Equation 1 is represented by the following radical:

$$-CH_2-CH_2-\underset{\underset{\underset{\underset{SH}{|}}{CH_2}}{|}}{\overset{\overset{|}{CH_2}}{N}}-CH_2-CH_2 \quad (11)$$

Organofunctional silanes may be made in monomeric form by resort to a different type of reaction than those described above. In the following equation it is shown how a conventional addition reaction may be used.

$$A'-\underset{\underset{A'''}{|}}{\overset{\overset{A''}{|}}{Si}}-H + CH_2=CH-CH_2-\underset{\underset{R}{|}}{N}-CH_2-\underset{\underset{R}{|}}{CH}-SH$$

$$\downarrow$$

$$A'-\underset{\underset{A'''}{|}}{\overset{\overset{A''}{|}}{Si}}-(CH_2)_2-\underset{\underset{R}{|}}{N}-CH_2-\underset{\underset{R}{|}}{CH}-SH \quad (12)$$

In the above reaction, an unsaturated alkyl mercaptoalkyl amine is reacted with a hydrogen silane. The groups A', A'', A''' and R are chosen as described in Equation 1 above. Mercaptoalkyl alkenyl amines which are suitable for use in reactions of the type of Equation 12 are disclosed, for example, in U.S. Patent 2,998,451, issued to Hermann V. Boenig on Aug. 29, 1961 (assigned to Goodyear Tire & Rubber Co.).

The monomeric organosilicon compounds described above all exhibit one common characteristic—at least one carbon atom separates the mercaptan group from the silicon atom. It is necessary that the mercaptan group be separated from the silicon atom in this manner to avoid a split of the molecule at this juncture.

DISULFIDES

As can be seen, all of the monomeric compounds set forth above under the heading "Monomers" contain at least one mercaptan group. Disulfide compounds can be readily prepared from any of the mercaptan compounds by oxidation thereof under mild conditions. Of course, as is well known, the disulfides can be re-converted into the corresponding mercaptan compounds by action of mild reducing agents.

In general the disulfide compounds contemplated by the present invention may be represented by the following formula:

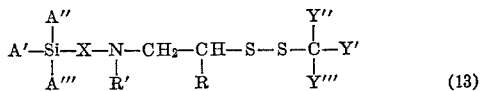
(13)

where A', A'', A''', X and R are as represented in connection with Equation 1 above, and Y', Y'', Y''' are selected from the group consisting of hydrogen and substituted and unsubstituted aliphatic, aryl, and aralkyl groups. Of course, where R' is the mercaptan group, then a disulfide linkage can be formed through this radical as well to form a three dimensional polymer.

If the disulfide is to be formed by oxidation of a single monomer, then the disulfide will be as follows:

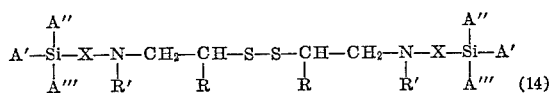
(14)

Of course, if a mixture of mercaptans is oxidized, then the disulfides which result will contain a number of unsymmetrical disulfides. In other words, if the mercaptan shown in Equation 2 is mixed with, for example, ethyl mercaptan, and the mixture is then oxidized, the resulting disulfides will contain molecules formed of mercaptan of Equation 2 and ethyl mercaptan. Such a disulfide would have the following formula:

$(OC_2M_5)_3$—Si—$(CH_2)_3$—NH
  —$CH_2$—$CH_2$—S—S—$CH_2$—$CH_3$   (15)

POLYMERS

The present invention contemplates monomeric compounds and polymeric compounds. The simplest polymeric compound contemplated by the present invention is in the form of a dimer. In a sense, the disulfides discussed above could be classified in that category.

Dimers of the present invention can be formed by reaction of two monomeric molecules which results in a linkage through the silicon atoms of the molecules. Thus, in the monomers set forth above, if the silicon atoms are connected to A', A'' and A''' by silicon carbon bonds, there will be little tendency for the silicon compound to hydrolyze at this point. In other words, such compounds will be stable to hydrolysis, and will not readily react under such conditions.

In the instance in which one of A', A'' and A''' is connected to the silicon atom through a hydrolyzable bond, then dimer formation is possible. Such would be the case if A', A'' or A''' was an alkoxy or substituted alkoxy group for example.

Assume, for the purposes of this illustration, that A' is an alkoxy group and A'' and A''' are alkyl groups. The organosilicon compound would then be as shown in the following formula:

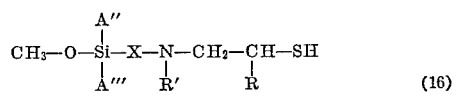
(16)

If the foregoing compound is exposed to hydrolyzing conditions, the following dimer is formed:

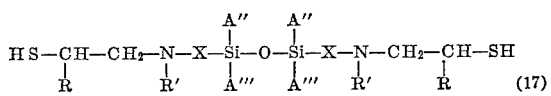
(17)

The dimer shown in Formula 17 can be oxidized to form a polymeric compound through the formation of disulfide linkages. In such instance the polymer formed would have a repeating group as follows:

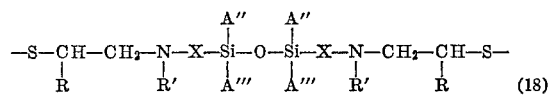
(18)

It will be readily seen that polymers of this invention may be formed of monomers set forth above in a slightly different manner. Thus, for example, the disulfide could first be formed from the organosilicon compound of Formula 16. Such a disulfide would have the following formula:

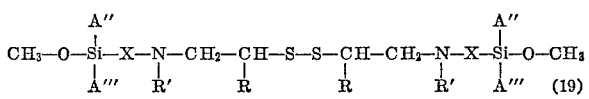
(19)

If such disulfide is then exposed to hydrolyzing conditions, a polymer would result having the following repeating structure.

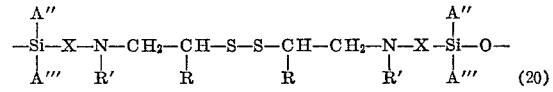
(20)

It is to be appreciated that very complicated polymeric compounds can be formed from the monomers contemplated by this invention. Thus, for example, in the instance where the monomer has a plurality of hydrolyzable groups attached to the silicon atoms, different polymers will result. If the organosilicon compound has two hydrolyzable groups attached to the silicon atom, linear polymers may be formed in a single step by exposing the monomer to hydrolyzing conditions. The repeating unit of a polymer formed in this manner from a monomer in which two of the groups attached to the silicon are hydrolyzable, could be schematically represented as follows:

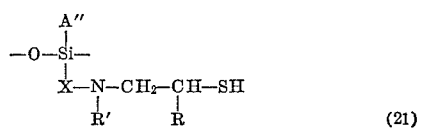
(21)

If the three groups attached to the silicon atom are hydrolyzable, complex three-dimensional polymers are formed under hydrolyzing conditions.

It can be appreciated that if monomers containing a plurality of hydrolyzable groups attached to the silicon atom are first oxidized to form the disulfides, then the polymers which result will have a different structure than that set forth above in Formulas 20 and 21.

In discussing the reactions through which monomers of this invention may be polymerized, the hydrolyzable group attached to the silicon atom has been described as being an alkoxy group. However, it is to be appreciated that other hydrolyzable groups such as halogen and thialkyl (—SR) will provide the same functionality.

In the discussion above concerning the formation of disulfide linkages to produce polymeric structures, the illustrative examples involve the oxidation of the terminal mercaptan group. As was indicated in the section discussing "Monomers" the radical R' can also include a mercaptan linkage. Thus, polymers could be formed through this linkage as well.

In addition to preparation of polymers from the monomers formed in accordance with the present invention, polymers can be formed directly in a single step. The following illustrates a general type of such reaction in which at least A' and A''' must be hydrolyzable:

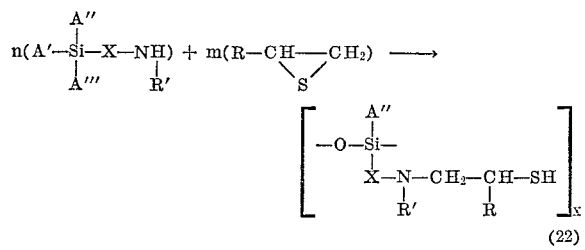
(22)

The presence of water or hydrogen ion is necessary to induce polymerization.

Typical of the general type of reaction set for the above in Equation 22 is the following reaction:

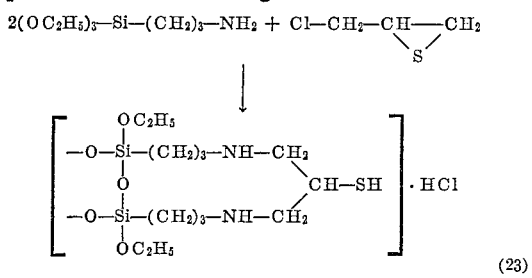
(23)

The hydrogen ion formed by alkylation of the amino group induces polymerization.

Reactions similar to reaction (23) may be carried out using ethylene monothiol carbonate or ethyl-2-mercapto ethyl carbonate in place of the sulfide.

The single step preparation of polymeric compounds of this invention, as indicated in the reaction above, is often advantageous when it is desired to prepare polymers in situ. In this case, a solution containing appropriate ratios of the monomers can be used to treat a material such as fibrous glass, and the polymerization is induced by evaporating the solvent and thus increasing the concentration of reactants.

As indicated above the preparation of the monomeric and polymeric silane compounds of the present invention can be carried out by several different methods. The method used in a particular instance will depend upon the specific structure desired, on the relative availability and cost of the starting materials, and on the use for which the compounds are intended.

The compounds in monomeric form are more soluble than the polymer, can be used in aqueous solution, and can be stored more readily than the polymer. Thus, in most instances, it would be desirable to prepare the monomer and store for future use.

In other instances, it may be desirable to make the polymer directly from the reactants in situ, thus avoiding the step of first preparing the monomer.

A major use of compounds of the present invention is for the treatment of glass in various forms. Thus, for example, glass in the form of fiber, yarn or fabric may be treated with the compounds of the present invention as a preliminary step in a bonding process in which the glass is to be bonded to a material, such as hydrocarbon rubber, which has an affinity for the mercaptan and/or disulfide linkages contained in the monomer. The compounds are also effective in bonding glass to other resinous compounds containing reactive functional groups, such as epoxy resins, unsaturated polyester resins, phenolic resins and the like.

With respect to forming a strong bond to a glass surface, the compounds of this invention should be in polymeric form. This can be accomplished in two ways. First, the monomer can be applied to the glass surface under hydrolyzing conditions. In this manner, the monomer will hydrolyze and polymerize directly on the glass surface. Alternatively, the polymer may be formed, either directly or by polymerization of the monomer, and the polymer applied to the glass.

In addition to the use of compounds of this invention for bonding glass to materials having affinity for sulfur, such as hydrocarbon rubbers, the compounds of this invention may also be used for improving the dyeability of glass fabrics with certain classes of dyes.

In short, the presence in a compound, either monomeric or polymeric, of (a) hydrolyzable groups attached to a silicon atom, thus imparting polymerization reactivity under hydrolyzing conditions; and (b) carbon linked mercaptan and/or disulfide linkages make such compounds useful in a variety of different applications.

The following examples are illustrative of the types of uses to which the compounds of the present invention may be put.

Example 1

Preparation of:

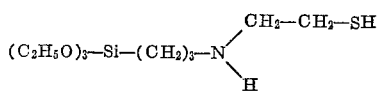

43.7 grams (0.42 mol) of ethylene monothiol carbonate were added dropwise with a stirring to a refluxing solution of 278 grams (1.26 mols) of gamma-aminopropyl triethoxy silane in 210 ml. of toluene. The mixture was refluxed with stirring for 17 hours, and the toluene was removed by distillation. Fractional distillation of the residue under reduced pressure yielded 92.2 grams (78% of the theoretical yield) of a water white liquid boiling at 104°–122° C. at 0.4–1.0 mm. which was N-beta mercaptoethylamino-propyl-triethoxy silane, Example 2

Preparation of:

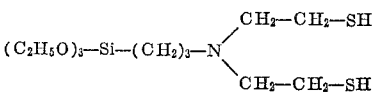

82 grams of the product of Example 1 (0.29 mol) were dissolved in 150 ml. of toluene, and the mixture was refluxed with stirring while 78 grams (0.75 mol) of ethylene monothiol carbonate were added dropwise after a period of 30 minutes. After completing the addition, the mixture was refluxed for 15 hours. The toluene and volatile contaminants were removed from the reaction mixture by distillation under reduced pressure up to a pot temperature of 100° C. at 1 mm., leaving 92 grams of a clear colorless liquid which consisted essentially of the desired product.

Example 3

The product of Example 2 was also prepared directly from gamma aminopropyl triethoxy silane in the following manner. 93 grams (0.42 mol) were dissolved in 200 ml. of toluene, and the solution was heated to reflux with stirring. 87.4 grams (0.84 mol) of ethylene monothiol carbonate were then added dropwise over a period of 15 minutes. After refluxing for 15 hours, the reaction mixture was distilled under reduced pressure (to 0.3 mm.) until solvent and volatile components were removed.

Example 4

The product of Example 1 was oxidized to the corresponding disulfide:

$(C_2H_5O)_3$—Si—$(CH_2)_3$—NH—$(CH_2)_2$
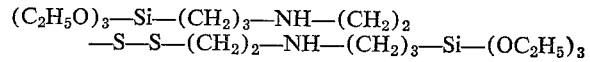

in the following manner. 50 ml. of an 8.8% solution of iodine in benzene (0.0175 mol iodine) were added to a solution of 10 grams (0.033 mol) of the product of Example 1 in 50 grams of benzene. After the solution had been allowed to stand for a few minutes at room temperature titration with sodium thiosulfate indicated that no mercapto groups remained. The hydrogen iodide was removed from the reaction mixture by adding 6.4 ml. of a 50% solution of triethylamine in benzene, and filtering off the precipitated triethylamine hydroiodide. The filtrate was stripped to remove the solvent, and the disulfide was obtained as a mercaptan-free dark viscous liquid.

Example 5

Preparation of copolymer of 3-chloropropylene sulfide-1,2 and gamma-aminopropyl triethoxy silane.

0.5 ml. of 3-chloropropylene sulfide-1,2 and 1.5 ml. of gamma-aminopropyl triethoxy silane were mixed in a tightly closed tube. After a few minutes the reaction mixture became warm and began to increase in viscosity. After two days at room temperature, an extremely viscous semisolid product was obtained. After 19 days at room temperature a soft, tacky viscoelastic material resembling a plasticized uncured rubber had formed.

Example 6

Preparation of copolymer of 3-chloro-propylene sulfide and gamma-aminopropyl triethoxy silane.

0.5 ml. of 3-chloropropylene sulfide-1,2, 1.5 ml. of gamma-aminopropyl triethoxy silane and 8 ml. of methyl ethyl ketone solvent were mixed in a tightly capped tube. The solution became hazy almost immediately, and a white powder began to precipitate, the amount gradually increasing as the reaction mixture was allowed to stand at room temperature. After 5 days at room temperature, the precipitate was filtered, washed with methyl ethyl ketone and dried in vacuo to constant weight. The product weighed 0.47 gram, and its analysis gave the following results.

Found: N, 10.0%; S, 5.54%; Cl, 13.7%.

Example 7

Under conditions similar to those described in Example 6, but employing different ratios of 3-chloropropylene sulfide (CPS) and gamma-aminopropyl triethoxy silane (APTES) in methyl ethyl ketone solution, the copolymers obtained had similar composition (despite the different monomer ratios used), as shown by the following analytical results.

| Volume ratio CPS/APTES | Reaction conditions | Percent N | Percent S | Percent Si | Percent Cl |
|---|---|---|---|---|---|
| A 1/9 | 90 min. 58° C | 8.04 | 3.49 | 18.26 | 16.27 |
| B 1/3 | 22 hrs. 25° C | 7.93 | 3.17 | 17.55 | 16.77 |

Example 8

Copolymer of 3-chloropropylene sulfide-1,2 and beta (aminoethylamino) ethyl trimethoxy silane.

1 ml. of 3-chloropropylene sulfide and 1 ml. of beta (aminoethylamino) ethyl trimethoxy silane were mixed while cooling in an ice bath to avoid violent reaction. After one hour at 25° C., the reaction mixture formed a pale yellow insoluble gel. When the experiment was repeated with 0.5 ml. of 3-chloropropylene sulfide and 1 ml. of beta (aminoethylamino) ethyl trimethoxy silane, a viscous amber liquid was obtained.

Example 9

(A) 1 ml. of 3-chloropropylene sulfide and 1 ml. of beta (aminoethylamino) ethyl trimethoxy silane were dissolved in 8 ml. of methyl ethyl ketone, and the mixture was allowed to stand at room temperature for 2 days. The brown precipitate formed was filtered, washed with acetone and dried. 1.1 grams of this polymer were obtained. (B) The experiment of Example 9(A) was repeated using 1.5 ml. of 3-chloropropylene sulfide and 0.5 ml. of beta (aminoethylamino) ethyl trimethoxy silane. The yield of polymer was 0.36 grams. The analysis of samples (A) and (B) gave the following results.

Copolymer (A): N, 8.39%; S, 7.2%. Copolymer (B): N, 7.51%; S, 6.41%.

Example 10

About 10% of water was worked into the soft rubbery product of Example 5 without changing its consistency appreciably. When the hydrated mass was cured at 110° C. for 10 minutes, it was converted to a friable, colorless rubbery product.

Example 11

When a film obtained from the product of Example 5 was cured in a forced draft oven at 110° C. for 45 minutes, it became harder, less extensible and non-tacky, indicating that curing had taken place.

Example 12

A copolymer was prepared by the procedure described in Example 5 from equal volumes of 3-chloropropylene sulfide and gamma-aminopropyl triethoxy silane in absence of diluent or solvent. A portion of the viscous liquid so obtained was cured at 110° C. for 45 minutes, yielding a clear hard polymer which adhered well to glass. 10% water was added to a second portion of the viscous liquid copolymer, and the resulting cloudy white liquid was cured in two minutes at 110° C. to a soft, friable, opaque white gel which appeared unaffected by further heating.

Example 13

2% water was added to a freshly prepared mixture of equal volumes of 3-chloropropylene sulfide and gamma-aminopropyl triethoxy silane at 25° C. The reaction mixture immediately became warm, and after 10 minutes evolved steam violently, forming a soft, porous, slightly elastic friable white solid.

Example 14

A 2% aqueous solution of the product of Example 1 was adjusted to pH 3.0 with acetic acid. A sample of woven fiberglass fabric was impregnated with this solution on a laboratory padder, and dried in a forced draft oven at 250° F. for 10 minutes. The fabric so treated had excellent adhesion to rubber (see examples below). The aqueous solution employed in this example remained free of precipitate after a week's storage at room temperature.

Example 15

A 2% solution of the product of Example 1 was prepared in xylene, and acetic acid was added in an amount comparable to that used in Example 14. A sample of woven fiberglass fabric was impregnated with the solution on a laboratory padder, and dried for 10 minutes at 250° F. The fabric so treated exhibited adhesion to rubber comparable to the fabric treated from aqueous solution as described in Example 14 (see examples below).

Example 16

A sample of woven fiberglass was treated with a 2% xylene solution of the product of Example 2 by padding, and drying for 10 minutes at 250° F.

Example 17

The woven glass fabric samples prepared as described in Examples 14, 15, and 16 were tested for adhesion to natural rubber (sulfur cured) by treating with a standard rubber compound formulation, curing for 20 minutes at 307° F., and subjecting strips of the rubber/fabric samples to a peel test. The peel test used was a modification of the test for adhesion of rubber to rubber designated as ASTM Test Method B–413–39. In the test as modified, the glass fabric sample was molded between rubber faces.

The results obtained are summarized in the table below.

| Glass fabric sample | Glass rubber adhesion, lbs./inch | Remarks |
|---|---|---|
| (A) Example 14 | 65 | Rubber failure. |
| (B) Example 15 | 60 | Do. |
| (C) Example 16 | 35 | Do. |
| (D) Treated with gamma-aminopropyl triethoxy silane. | 11 | Do. |
| (E) Treated with epoxy silane Z–6040 (Dow Corning). | 6 | Do. |
| (F) Control (heat cleaned only) | 3 | Do. |

The outstanding adhesion to rubber of the glass fabrics treated in Examples 14, 15, 16 is demonstrated by these results.

Example 18

The dyeability of glass fabric samples prepared in Examples 14 and 15 was evaluated by dyeing with 2% each of the following dyestuffs.

| Dyestuff | Color Index designation |
|---|---|
| (a) Eastone Brown 2R | Disperse Orange 5. |
| (b) Fast Acid Violet RL Conc. | Acid Violet 1. |
| (c) Belamine Fast Red 8BL–125% | Direct Red 81. |
| (d) Procion Brilliant Blue H50S | Fiber reactive. |

Standard dyeing procedures were used for each of the above dyestuffs, and the variations in shade shown in the table below were recorded.

| Glass fabric sample | Dyestuff sample | | | |
|---|---|---|---|---|
| | (a) | (b) | (c) | (d) |
| (A) Example 14 | Excellent | Excellent | Fair | Good. |
| (B) Example 15 | do | do | do | Do. |
| (D) Treated with gamma-aminopropyl triethoxy silane. | Staining | Nil | Staining | Do. |
| (E) Treated with epoxy silane Z–6040 (Dow Corning). | Good | Nil | Slight stain | Slight stain. |
| (F) Control (heat cleaned only) | Slight stain | Nil | do | Do. |

It is apparent that treatment of glass fabric with compounds of the present invention substantially enhance dye receptivity.

It is to be noted that each of the organosilicon compounds of the above examples embodies at least one carbon-linked amino nitrogen. The amino nitrogen is present due to the use of amino silanes. It is believed that the presence of such amino nitrogen groups enhances the characteristics of the compounds, by, for example, increasing the dye receptivity of treated glass surfaces and increasing the reactivity and catalytic activity of the organosilicon compounds when used in epoxy resin-glass systems.

In the illustrative embodiments and examples described above, certain specific sulfur-containing compounds are used. It is to be understood that these specific compounds are representative members of the following generic groups:

(1) Monothiol carbonates.
(2) Organic epi-sulfides.
(3) Mercaptoalkyl alkyl carbonates.

Accordingly, other members of the above three groups can be successfully employed in the practice of the present invention.

The present invention contemplates a novel group of compounds, both monomeric and polymeric which preferably contain at least two different active functional groups. Providing at least one hydrolyzable group attached to the silicon atom furnishes a site which is useful for reacting with a surface such as glass. In addition, the presence of mercaptan and/or disulfide linkages provides reactivity sites which can be used to link these compounds with materials which have an affinity for sulfur, such as hydrocarbon rubber or other vulcanizable materials.

What is claimed is:

1. Glass having a surface coating of a polymer of an organosilicon compound, said compound comprising (a) a silicon-containing radical of the formula

wherein each of A′, A″ and A‴ is selected from the group consisting of substituted and unsubstituted aliphatic, aryl, aralkyl radicals and hydrolyzable radicals, at least one of said A′, A″ and A‴ being a hydrolyzable radical; and (b) at least one sulfur atom in the form of a mercaptan group or a disulfide linkage, said silicon and sulfur being interconnected by a divalent organic radical having terminal carbon atoms and at least one amino nitrogen interposed in the chain connecting said terminal carbon atoms.

2. Glass coated with a polymer comprising (a) a first repeating unit having the formula:

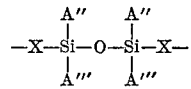

wherein A″ and A‴ are selected from the group consisting of substituted and unsubstituted aliphatic, aryl, aralkyl radicals, and X is selected from the group consisting of a divalent organic radical having terminal carbon atoms and —CH₂—; and (b) a second repeating unit having the formula:

said first and said second repeating groups being alternately positioned in said polymeric compound and being separated through a linkage having terminal carbon atoms and consisting of substituted or unsubstituted aliphatic hydrocarbon groups and having at least one amino nitrogen interposed in the chain connecting said terminal carbon atoms.

3. Glass coated with a polymer comprising a repeating unit of the formula:

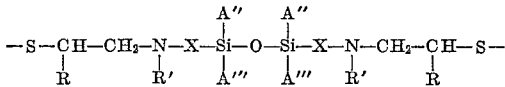

wherein X is selected from the group consisting of a divalent organic radical having terminal carbon atoms and —CH₂—; A″ and A‴ are selected from the group consisting of substituted and unsubstituted aliphatic, aryl, aralkyl radicals; R is selected from the group consisting of hydrogen, substituted and unsubstituted aliphatic, aryl and aralkyl radicals; and R′ is selected from the group consisting of hydrogen, substituted and unsubstituted aliphatic radicals and the following group:

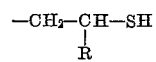

4. Glass coated with a polymer comprising the repeating unit:

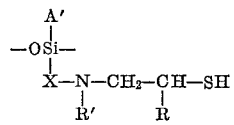

wherein A' is selected from the group consisting of substituted and unsubstituted aliphatic aryl and aralkyl radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

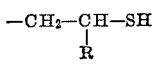

5. Glass coated with a polymer comprising the repeating unit:

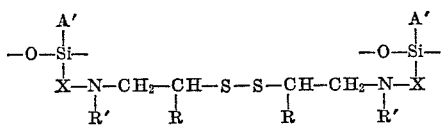

wherein A' is selected from the group consisting of substituted and unsubstituted aliphatic, aryl and aralkyl radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

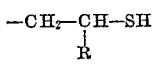

6. Glass coated with a polymer formed by subjecting to hydrolyzing conditions a compound of the formula:

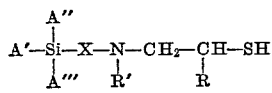

where at least one of A', A'' and A''' is a hydrolyzable radical and the remainder are selected from the group consisting of substituted and unsubstituted aliphatic, aryl and aralkyl radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals, and the following group;

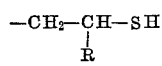

7. The coated glass as claimed in claim 6 wherein each of A', A'' and A''' is a hydrolyzable radical.

8. The coated glass as claimed in claim 7 wherein A', A'' and A''' are alkoxy radicals.

9. The coated glass as claimed in claim 8 wherein said compound is represented by the formula:

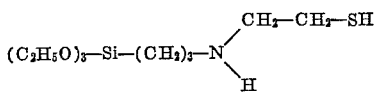

10. The coated glass as claimed in claim 8 wherein said compound is represented by the formula;

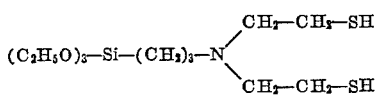

11. A method for dyeing glass comprising contacting a glass having a coated surface with an organic dye stuff, said coated surface comprising a polymer of an organo-silicon compound, said compound comprising (a) a silicon-containing radical of the formula

wherein each of A', A'' and A''' is selected from the group consisting of substituted and unsubstituted aliphatic, aryl, aralkyl radicals and hydrolyzable radicals, at least one of said A', A'' and A''' being a hydrolyzable radical; and (b) at least one sulfur atom in the form of a mercaptan group or a disulfide linkage, said silicon and sulfur being interconnected by a divalent organic radical having terminal carbon atoms and at least one amino nitrogen interposed in the chain connecting said terminal carbon atoms.

12. The process as claimed in claim 11 wherein said dyestuff is an acid dye.

13. The process as claimed in claim 11 wherein said dyestuff is a disperse dye.

14. A method for dyeing glass comprising contacting a coating on the surface of said glass with an organic dye stuff, said coating comprising a polymer formed by subjecting to hydrolyzing conditions a compound of the formula:

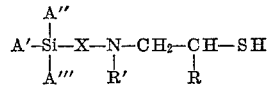

where at least one of A', A'' and A''' is a hydrolyzable radical; X is selected from the group consisting of a divalent organic radical having terminal crabon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals, and the following group:

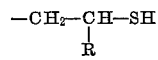

15. The process as claimed in claim 14 wherein said dyestuff is an acid dye.

16. The process as claimed in claim 14 wherein said dyestuff is a disperse dye.

17. The process comprising treating a glass surface with a polymer of an organosilicon compound, said compound comprising (a) a silicon containing radical of the formula

wherein each of A', A'' and A''' is selected from the group consisting of substituted and unsubstituted aliphatic, aryl, aralkyl radicals and hydrolyzable radicals, at least one of said A', A'' and A''' being a hydrolyzable radical; and (b) at least one sulfur atom in the form of a mercaptan group or a disulfide linkage, said silicon and sulfur being connected by a divalent organic radical having terminal carbon atoms and at least one amino nitrogen, and subjecting the treated glass to hydrolyzing conditions.

18. The process comprising treating a glass surface with a compound represented by the formula:

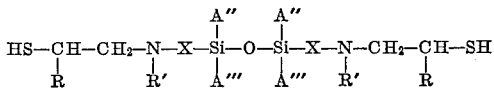

wherein A'' and A''' are selected from the group consisting of substituted and unsubstituted aliphatic, aryl, aralkyl radicals; X is selected from the group consisting of a divalent organic radical having terminal carbon atoms and —CH$_2$—; R is selected from the group consisting of hydrogen, substituted and unsubstituted aliphatic, aryl and aralkyl radicals; R' is selected from the group consisting of hydrogen, substituted and unsubstituted aliphatic radicals and the following group:

$$-CH_2-CH-SH$$
$$\quad\quad\;\;|$$
$$\quad\quad\;\;R$$

and subjecting the treated glass to oxidizing conditions.

19. The process comprising treating a glass surface with a compound of the formula:

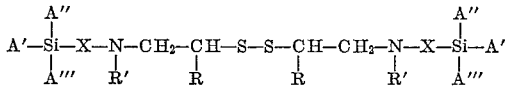

wherein A' is a hydrolyzable radical; A" and A''' are selected from the group consisting of substituted and unsubstituted aliphatic, aryl, aralkyl radicals; A is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

$$-CH_2-CH-SH$$
$$\quad\quad\;\;|$$
$$\quad\quad\;\;R$$

and subjecting the treated glass to hydrolyzing conditions.

20. The process comprising treating a glass surface with a compound of the formula:

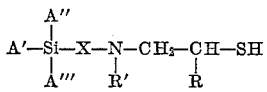

wherein A" and A''' are hydrolyzable radicals; A' is selected from the group consisting of substituted and unsubstituted aliphatic, aryl, aralkyl radicals; X is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

$$-CH_2-CH-SH$$
$$\quad\quad\;\;|$$
$$\quad\quad\;\;R$$

and subjecting the treated glass to hydrolyzing conditions.

21. The process comprising treating a glass surface with a compound of the formula:

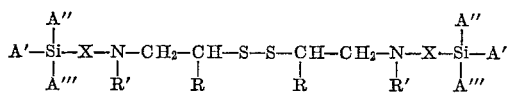

wherein A" and A''' are hydrolyzable radicals, A' is selected from the group consisting of substituted and unsubstituted aliphatic, aryl, aralkyl radicals; X is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

$$-CH_2-CH-SH$$
$$\quad\quad\;\;|$$
$$\quad\quad\;\;R$$

and subjecting the treated glass to hydrolyzing conditions.

22. The process comprising treating a glass surface with a compound of the formula:

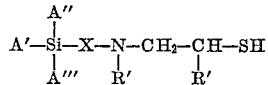

wherein at least one of A', A" and A''' is a hydrolyzable radical and the remainder are selected from the group consisting of substituted and unsubstituted aliphatic, aryl, aralkyl radicals; X is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

$$-CH_2-CH-SH$$
$$\quad\quad\;\;|$$
$$\quad\quad\;\;R$$

and subjecting the treated glass to hydrolyzing conditions.

23. The process according to claim 22 wherein A', A" and A''' are all hydrolyzable radicals.

24. The process as claimed in claim 23 wherein each of A', A", and A''' is alkoxy.

25. The process as claimed in claim 23 wherein said compound is represented by the formula:

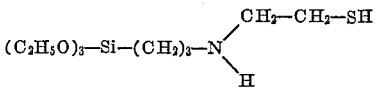

26. The process as claimed in claim 23 wherein said compound is represented by formula:

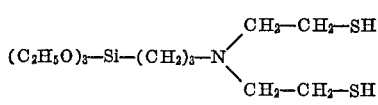

27. Glass having a surface coating of an organosilicon compound of the formula:

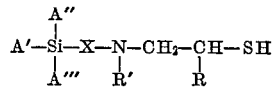

wherein at least one of A', A" and A''' is hydrolyzable and the remainder are selected from the group consisting of substituted and unsubstituted aliphatic, aryl, aralkyl radicals; X is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

$$-CH_2-CH-SH$$
$$\quad\quad\;\;|$$
$$\quad\quad\;\;R$$

28. The coated glass as claimed in claim 27 wherein each of A', A", and A''' is a hydrolyzable radical.

29. The coated glass as claimed in claim 28 wherein each of A', A", and A''' is an alkoxy radical.

30. The coated glass as claimed in claim 29 wherein said compound is represented by the formula:

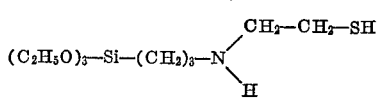

31. The coated glass as claimed in claim 29 wherein said compound is represented by the formula:

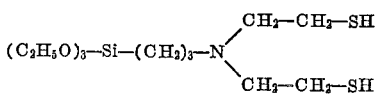

32. Glass having a surface coating of an organosilicon disulfide compound of the formula:

$$\begin{array}{c} A'' \quad\quad\quad\quad Y'' \\ A'-\underset{\underset{A'''}{|}}{Si}-X-\underset{\underset{R'}{|}}{N}-CH_2-CH-S-S-\underset{\underset{Y'''}{|}}{C}-Y' \\ \phantom{A'-Si-X-N-CH_2-}R \end{array}$$

wherein at least one of A', A'' and A''' is a hydrolyzable radical and the remainder are selected from the group consisting of substituted and unsubstituted aliphatic, aryl and aralkyl radicals; Y', Y'' and Y''' are selected from the group consisting of hydrogen and substituted and unsubstituted aliphatic, aryl and aralkyl groups; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals, and the following group:

$$-CH_2-\underset{\underset{R}{|}}{CH}-SH$$

33. The coated glass as claimed in claim 32 wherein R' is the group:

$$-CH_2-\underset{\underset{R}{|}}{CH}-SH$$

34. The coated glass as claimed in claim 32 wherein Y'' is selected as hydrogen, Y''' is selected as R, and Y' is selected as the radical $$-CH_2-\underset{\underset{R'}{|}}{N}-X-\underset{\underset{A'''}{|}}{\overset{\overset{A''}{|}}{Si}}-A'$$

35. Glass having a surface coating of an organosilicon compound of the formula:

$$\begin{array}{c} A'' \quad\quad\quad\quad Y'' \\ A'-\underset{\underset{A'''}{|}}{Si}-X-N-CH_2-CH-S-S-\underset{\underset{Y'''}{|}}{C}-Y' \\ \phantom{A'-Si-X-}\underset{\underset{}{}}{|}\phantom{-CH_2-}\underset{}{|} \\ \phantom{A'-Si-X-}CH_2\phantom{-CH_2-}R \\ \phantom{A'-Si-X-}\underset{R}{|}\overset{}{C}H \quad Y'' \\ \phantom{A'-Si-}S-S-\underset{\underset{Y'''}{|}}{C}-Y' \end{array}$$

wherein at least one of A', A'' and A''' is a hydrolyzable radical and the remainder are selected from the group consisting of substituted and unsubstituted aliphatic, aryl and aralkyl radicals; Y', Y'' and Y''' are selected from the group consisting of hydrogen and substituted and unsubstituted aliphatic, aryl and aralkyl groups; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting or hydrogen, substituted and unsubstituted aliphatic radicals, and the following group:

$$-CH_2-\underset{\underset{R}{|}}{CH}-SH$$

36. Glass having a surface coating of an organosilicon compound of the formula:

$$HS-\underset{\underset{R}{|}}{CH}-CH_2-\underset{\underset{R'}{|}}{N}-X-\underset{\underset{A'''}{|}}{\overset{\overset{A''}{|}}{Si}}-O-\underset{\underset{A'''}{|}}{\overset{\overset{A''}{|}}{Si}}-X-\underset{\underset{R'}{|}}{N}-CH_2-\underset{\underset{R}{|}}{CH}-SH$$

wherein A'' and A''' are selected from the group consisting of substituted and unsubstituted aliphatic, aryl and aralkyl radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

$$-CH_2-\underset{\underset{R}{|}}{CH}-SH$$

37. A laminate body comprising glass having a surface coating of a polymer of an organosilicon compound, said compound comprising (a) a silicon-containing radical of the formula $$A'-\underset{\underset{A'''}{|}}{\overset{\overset{A''}{|}}{Si}}-$$

wherein each of A', A'' and A''' is selected from the group consisting of substituted and unsubstituted aliphatic, aryl, aralkyl radicals and hydrolyzable radicals, at least one of said A', A'' and A''' being a hydrolyzable radical, and (b) at least one sulfur atom in the form of a mercaptan group or a disulfide linkage, said silicon and sulfur being interconnected by a divalent organic radical having terminal carbon atoms and at least one amino nitrogen interposed in the chain connecting said terminal carbon atoms; and a sulfur vulcanizable polymer bonded to said coated glass through said polymer.

38. A method for bonding glass coated with a polymer of an organosilicon compound, said compound comprising (a) a silicon-containing radical of the formula $$A'-\underset{\underset{A'''}{|}}{\overset{\overset{A''}{|}}{Si}}-$$

wherein each of A', A'' and A''' is selected from the group consisting of substituted and unsubstituted aliphatic, aryl, aralkyl radicals and hydrolyzable radicals, at least one of said A', A'' and A''' being a hydrolyzable radical, and (b) at least one sulfur atom in the form of a mercaptan group or a disulfide linkage, said silicon and sulfur being interconnected by a divalent organic radical having terminal carbon atoms and at least one amino nitrogen interposed in the chain connecting said terminal carbon atoms to a sulfur vulcanizable polymeric material, said method comprising contacting the polymer coating on the glass with a sulfur vulcanizable polymeric material and curing the assembly of glass and material to form a bond.

39. The method for bonding glass coated with a polymer of an organosilicon compound, said compound comprising (a) a first repeating unit having the formula:

$$-X-\underset{\underset{A'''}{|}}{\overset{\overset{A''}{|}}{Si}}-O-\underset{\underset{A'''}{|}}{\overset{\overset{A''}{|}}{Si}}-X-$$

wherein A'' and A''' are selected from the group consisting of substituted and unsubstituted aliphatic, aryl and aralkyl radicals, and X is selected from the group consisting of a divalent organic radical having terminal carbon atoms and —CH$_2$—, and (b) a second repeating unit having the formula:

$$-S-S-$$

said first and said second repeating groups being alternately positioned in said polymeric compound and being separated through a linkage having terminal carbon atoms and consisting of substituted and unsubstituted aliphatic hydrocarbon groups and having at least one amino nitrogen interposed in the chain connecting said terminal carbon atoms, said method comprising contacting the polymer coating on the glass with a sulfur vulcanizable polymeric material and curing the assembly of glass and material to form a bond.

40. The method for bonding glass coated with a polymer of an organosilicon compound, said compound comprising a repeating unit of the formula:

$$-S-CH-CH_2-N-X-\underset{\underset{A'''}{|}}{\overset{\overset{A''}{|}}{Si}}-O-\underset{\underset{A'''}{|}}{\overset{\overset{A''}{|}}{Si}}-X-N-CH_2-CH-S-$$
$$\underset{R}{|} \quad \underset{R'}{|} \qquad \qquad \underset{R'}{|} \quad \underset{R}{|}$$

wherein A" and A''' are selected from the group consisting of substituted and unsubstituted aliphatic, aryl and aralkyl radicals; X is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals, and the following group:

$$-CH_2-\underset{\underset{R}{|}}{CH}-SH$$

said method comprising contacting the polymer coating on the glass with a sulfur vulcanizable polymeric material and curing the assembly of glass and material to form a bond.

41. The method for bonding glass coated with an organosilicon polymer, said polymer comprising a repeating unit:

$$-O\underset{\underset{\underset{R'}{|}}{\overset{\overset{A'}{|}}{Si}}-}{}$$
$$X-N-CH_2-\underset{\underset{R}{|}}{CH}-SH$$

wherein A' is selected from the group consisting of substituted and unsubstituted aliphatic, aryl and aralkyl radicals; X is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

$$-CH_2-\underset{\underset{R}{|}}{CH}-SH$$

said method comprising contacting the polymer coating on the glass with a sulfur vulcanizable polymeric material and curing the assembly of glass and material to form a bond.

42. The method for bonding glass coated with an organosilicon polymer, said polymer comprising a repeating unit:

$$-O-\underset{\underset{|}{\overset{\overset{A'}{|}}{Si}}-}{} \qquad \qquad -O-\underset{\underset{|}{\overset{\overset{A'}{|}}{Si}}-}{}$$
$$X-N-CH_2-CH-S-S-CH-CH_2-N-X$$
$$\underset{R'}{|} \quad \underset{R}{|} \qquad \underset{R}{|} \quad \underset{R'}{|}$$

wherein A' is selected from the group consisting of substituted and unsubstituted aliphatic, aryl and aralkyl radicals; A is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals and the following group:

$$-CH_2-\underset{\underset{R}{|}}{CH}-SH$$

said method comprising contacting the polymer coating on the glass with a sulfur vulcanizable polymeric material and curing the assembly of glass and material to form a bond.

43. The method for bonding glass coated with an organosilicon polymer, said polymer comprising the polymer formed by subjecting to hydrolyzing conditions a compound of the formula:

$$A'-\underset{\underset{A'''}{|}}{\overset{\overset{A''}{|}}{Si}}-X-N-CH_2-\underset{\underset{R}{|}}{CH}-SH$$
$$\underset{R'}{|}$$

wherein at least one of A', A" and A''' is a hydrolyzable radical; X is selected from the group consisting of a divalent organic radical having terminal carbon atoms and —$CH_2$—; R is selected from the group consisting of hydrogen, substituted and unsubstituted aliphatic, aryl and aralkyl radicals; and R' is selected from the group consisting of hydrogen, substituted and unsubstituted aliphatic radicals, and the following group:

$$-CH_2-\underset{\underset{R}{|}}{CH}-SH$$

said method comprising contacting the polymer coating on the glass with a sulfur vulcanizable polymeric material and curing the assembly of glass and material to form a bond.

44. The method according to claim 43 wherein each of A', A" and A''' is a hydrolyzable radical.

45. The method according to claim 44 wherein A', A" and A''' are alkoxy radicals.

46. The method according to claim 45 wherein said compound is represented by the formula:

$$(C_2H_5O)_3-Si-(CH_2)_3-N\begin{matrix}CH_2-CH_2-SH \\ \\ CH_2-CH_2-SH\end{matrix}$$

References Cited

UNITED STATES PATENTS 3,169,884 2/1965 Marzocchi et al. ___ 117—126 X
3,249,461 5/1966 TeGrotenhuis _____ 17—126 X

OTHER REFERENCES

"Organo Functional Silanes," Union Carbide, Published 1956, pp. 8, 10, 14.

DAVID KLEIN, Primary Examiner

U.S. Cl. X.R.

8—8; 117—124, 126; 156—329, 331

PO-1050
(5/69)

UNITED STATES PATENT OFFICE
CERTIFICATE OF CORRECTION

Patent No. 3,468,751     Dated  September 23, 1969

Inventor(s)  Giuliana C. Tesoro

It is certified that error appears in the above-identified patent and that said Letters Patent are hereby corrected as shown below:

Col 1, Line 56: "sulphur" should be --surface--
Col 2, Line 65: Insert --(Triethoxy-gamma amino propyl silane) (ethylene sulfide)-- above formula 2
Col 3, Line 45: (formula 5) "$-NH_2(CH_2)_2-$" should be $--NH(CH_2)_2--$
Col 4, Line 27: "two" should appear after --the--
Col 4, Line 49: (formula 12) "$-(CH_2)_2$" should read $--(CH_2)_3$
Col 5, Line 10: After "X" insert -- and R' --
Col 5, Line 35: (formula 15) "$M_5$" should read $--H_5--$
Col 7, Line 15: "set for the" should be --set forth--
Col 11, Lines 5-10 in the chart:  Under "Remarks" should read
  Rubber failure
  Rubber failure
  - - -
  - - -
  - - -
  - - -

Col 11, Line 25: "H50S" should be --H5GS--
Col 14, Line 33: "crabon" should be --carbon--
Col 17, Line 58: "or" should be --of--
In the second Reference Cited: the class number "17" should read --117--

SIGNED AND
SEALED
MAY 12 1970

(SEAL)
Attest:

Edward M. Fletcher, Jr.
Attesting Officer

WILLIAM E. SCHUYLER, JR.
Commissioner of Patents